(12) United States Patent
Schuckenbrock et al.

(10) Patent No.: US 8,799,449 B2
(45) Date of Patent: Aug. 5, 2014

(54) INFORMATION TECHNOLOGY REMOTE SERVICES MANAGEMENT ENVIRONMENT

(75) Inventors: Stephen Francis Schuckenbrock, Austin, TX (US); Rajveer Singh Kushwaha, Austin, TX (US); Timothy Abels, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 823 days.

(21) Appl. No.: 12/016,813

(22) Filed: Jan. 18, 2008

(65) Prior Publication Data

US 2009/0187651 A1    Jul. 23, 2009

(51) Int. Cl.
G06F 15/173    (2006.01)

(52) U.S. Cl.
USPC ........................................... 709/224

(58) Field of Classification Search
USPC ................................. 709/223–226
See application file for complete search history.

(56) References Cited

U.S. PATENT DOCUMENTS

| | | | |
|---|---|---|---|
| 6,026,440 A * | 2/2000 | Shrader et al. ............... | 709/224 |
| 6,219,700 B1 | 4/2001 | Chang et al. | |
| 6,321,262 B1 | 11/2001 | Springer | |
| 6,438,954 B1 | 8/2002 | Goetz et al. | |
| 6,460,178 B1 | 10/2002 | Chan et al. | |
| 6,560,726 B1 | 5/2003 | Vrhel, Jr. et al. | |
| 6,598,174 B1 | 7/2003 | Parks et al. | |
| 6,606,716 B1 | 8/2003 | Vrhel, Jr. et al. | |
| 6,606,744 B1 | 8/2003 | Mikurak | |
| 6,760,483 B1 | 7/2004 | Elichai et al. | |
| 6,760,903 B1 | 7/2004 | Morshed et al. | |
| 6,792,460 B2 | 9/2004 | Oulu et al. | |
| 7,519,972 B2 * | 4/2009 | Carr et al. ...................... | 719/318 |
| 7,711,814 B1 * | 5/2010 | Emerick et al. ............... | 709/224 |
| 8,150,960 B2 * | 4/2012 | Kumbalimutt ................ | 709/224 |
| 2001/0016880 A1 * | 8/2001 | Cai et al. ....................... | 709/321 |
| 2001/0020249 A1 * | 9/2001 | Shim ............................. | 709/220 |
| 2002/0059410 A1 * | 5/2002 | Hara et al. ..................... | 709/223 |
| 2004/0030879 A1 * | 2/2004 | Subramanian et al. ........... | 713/1 |
| 2006/0004830 A1 * | 1/2006 | Lora et al. ..................... | 707/102 |
| 2007/0143434 A1 * | 6/2007 | Daigle .......................... | 709/207 |
| 2008/0120607 A1 * | 5/2008 | Dippel .......................... | 717/137 |
| 2008/0276295 A1 * | 11/2008 | Nair ................................. | 726/1 |
| 2009/0089699 A1 * | 4/2009 | Saha et al. .................... | 715/771 |
| 2009/0106571 A1 * | 4/2009 | Low et al. ..................... | 713/310 |

OTHER PUBLICATIONS

Nystrom et al., A Formalization of Service Independent Building Blocks, 1996, http://citeseerx.ist.psu.edu/viewdoc/summary?doi=10.1.1.47.6907.*

(Continued)

*Primary Examiner* — Joseph E Avellino
*Assistant Examiner* — James Conaway
(74) *Attorney, Agent, or Firm* — Terrile, Cannatti, Chambers & Holland, LLP; Stephen A. Terrile

(57) ABSTRACT

An apparatus for providing remote services to an integrated information technology environment. The information technology environment comprises a services appliance. The services appliance provides agent-less monitoring of information handling systems within the information technology environment. The apparatus comprises a remote management platform. The remote management platform is configured to receive services information from the services appliance. The remote management platform analyzes the services information and determines a response based upon the services information. The remote management platform initiating the response by the remote management platform based upon the services information.

10 Claims, 9 Drawing Sheets

(56) References Cited

OTHER PUBLICATIONS

"Managing Desktop IT Assets Using as Internet-based Management Platform: The Everdream Solution." Apr. 2006. <http://www.everdream.com>.

Enterprise Management Associates. "How SilverBack Technologies is Leading the Way in the Mass Customization of Management Services." Jan. 2005. 3 pages.

"Remote Desktop Management Dell Remote Monitoring." <www.silverbacktech.com>.

* cited by examiner

| Base 310 | Asset Discovery 312 | Asset Mgmt. 314 | Software Distribution 316 | SW License Mgmt. 318 | Patch Mgmt. 320 | Anti-Malware Mgmt. 322 | Online Backup 324 | Remote Support 326 | Remote Access 328 | Data Encryption 330 | Connector APIs 332 |
|---|---|---|---|---|---|---|---|---|---|---|---|
| HW Inventory | Agentless HW Inventory | HW Changes | Package Creation | Enhanced SW Inventory | Patch Policies | OS Firewall Reporting | Internet Based | Not Integrated | Integrated | Internet Based | Service Desk |
| Site Creation | IP Device Discovery | HW Reports | Intelligent Package Distribution | SW Purchase Information | Automatic Patching | OS Firewall Config. | Electronic Distribution | Technician Based | Device Based | Electronic Distribution | Service Offering |
| Bandwidth Policies | Agentless SW Inventory | LAN Based Remote Control | Distribution Monitoring | SW Usage | Directed Multi-Patching | Initiate Virus Scan | Usage Reporting | Web Remote Control | Web Remote Control | Config. Mgmt. | SLA |
| Send Message to Device | Agentless Patch Inventory | HW Inventory Search | End User Portal | SW Changes | Uninstall Patches | Virus Detection | End User Self Service | End-User Initiated | End-User Auto Accept | Integrated | Billing |
| User Mgmt. | | Basic Inventory Search | | SW Reports | Patch OS | Monitor Definition Files | Remote Initiation of Backup | Remote Reboot/ Reconnect | Session Tracking | | Reports |
| Advanced Search | | Active Directory Sync | | SW Inventory Search | Patch Office | Force Definition Files | Config. Mgmt. | Screen/ Keyboard Lock | Remote Reboot/ Reconnect | | Analytics |

| Views | Browser | CRM | CMDB | SD | RE | Ticket/Orch | DW | SQL |
|---|---|---|---|---|---|---|---|---|

| Session Recording | Screen/Keyboard Lock |
|---|---|
| | Session Recording |
| | Electronic Distribution |

| SW License Reports | Patch Apps. | CE Supported | | |
|---|---|---|---|---|
| SW License Discovery | AU Mgmt. | Virus Scan Supported | | |
| Remote SW Uninstall | | SAV Firewall Mgmt. | | |
| | | Firewall Mgmt. | | |

| Device Purchase Information |
|---|
| Site Resolver |

| Dash-boards |
|---|
| Data Export |
| Remote Deployment |
| Web Services |
| Alerts and Notifications |
| Localization |

*Figure 3B*

| Figure 3A |
|---|
| Figure 3B |

INFORMATION TECHNOLOGY REMOTE SERVICES MANAGEMENT ENVIRONMENT

BACKGROUND OF THE INVENTION

1. Field of the Invention

The present invention relates to information handling systems and more particularly to an information technology remote services management environment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the proliferation of information handling systems, an important issue relates to the service and support of the information handling system installations (also often referred to as an information technology (IT) environment). One issue that relates to small to medium size IT environments (and sometimes even large scale environments) is that these environments often do not have a dedicated entity (e.g., IT staff) to service and support the IT environment. The entity that services and supports such an installation is often referred to as a service provider. A service provider provides a customer with an ability to procure, deploy, support and manage information handling system technologies across the life cycle of the information handling systems.

SUMMARY OF THE INVENTION

In accordance with the present invention, the invention relates to an apparatus for providing remote services to an integrated information technology environment. The information technology environment comprises a services appliance. The services appliance provides agent-less monitoring of information handling systems within the information technology environment. The apparatus comprises a remote management platform. The remote management platform is configured to receive services information from the services appliance. The remote management platform analyzes the services information and determines a response based upon the services information. The remote management platform initiating the response by the remote management platform based upon the services information.

In another embodiment, the invention relates to a method for providing remote services to an information technology environment, where the information technology environment comprises a services appliance and the services appliance provides agent-less monitoring of information handling systems within the information technology environment. The method comprises providing a remote management platform, receiving services information from the services appliance by the remote management platform, the remote management platform analyzing the services information and determining a response based upon the services information; and, initiating the response by the remote management platform based upon the services information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A and 3B, referred to herein collectively as FIG. 3, shows a block diagram of a plug in module of the service delivery platform.

DETAILED DESCRIPTION

Figure 1:
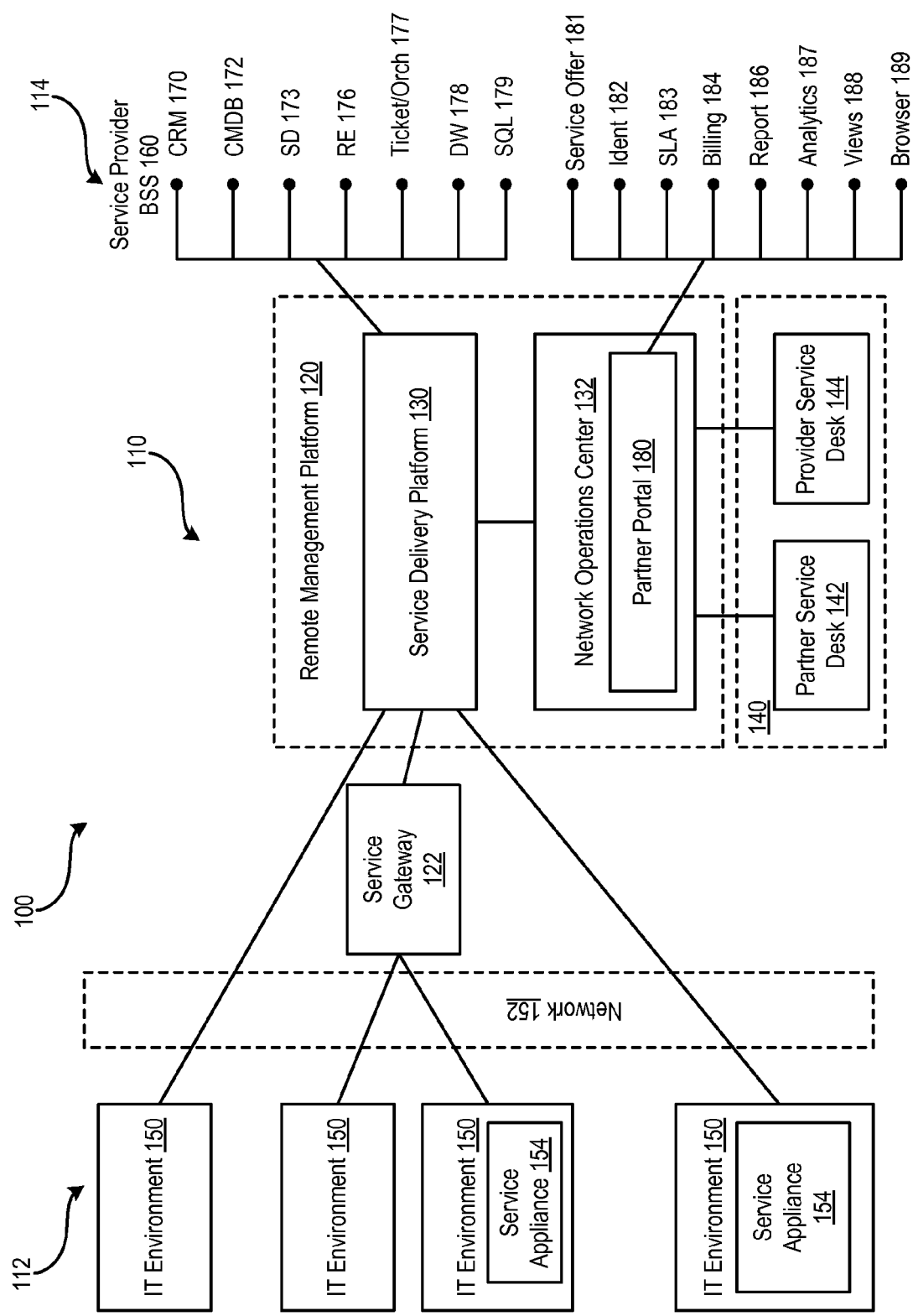
FIG. 1 shows a block diagram of a remote services management environment.

Referring to FIG. 1, a block diagram of a remote services management environment 100 is shown. More specifically, the remote services management environment includes a service provider portion 110, a customer portion 112, and a business support system (BSS) (also referred to as a back end) portion 114. The service provider portion 110 includes a remote management platform 120 and may optionally include a service gateway 122. The remote management platform 120 includes a service delivery platform 130 and may optionally include a network operations center (NOC) 132. The network operations center 132 may be located in a different physical location from the service delivery platform (e.g., the network operations center 132 may be a global NOC).

The service provider portion 120 may be coupled with a service desk operation 140, which may be a provider service desk operation 142, a partner service desk operation 144 or some combination of a provider service desk operation 142, a partner service desk operation 144.

The customer portion 112 can include one or more customer information technology (IT) environments 150. Each of the IT environments 150 may be agent type IT environments, agentless type IT environments or some combination of agent type IT environment and agentless type IT environment. The customer portion 112 may be coupled to the service provider portion 110 via a network 152 such as the Internet. Alternately, for certain types of secure IT environments, the customer portion may be decoupled from the service provider portion 110. In this type of configuration, the secure IT environment might include a dedicated services appliance 154 which generates and stores service information to some form of computer readable media. E.g., the service server 122b might save service information to a CD ROM, which is analyzed by customer personnel prior to being provided to the service provider portion 110.

The business support system portion 114 can include a service provider BSS 160 and/or a customer BSS. The service provider BSS 160 can be coupled to one or more of a plurality of back end systems such as a Centralized Resource Management (CRM) system 170, a configuration management database (CMDB) system 172, a Service Desk portion system 174, a global positioning system (GPS) module 175, a rules engine (RE) system 176, a ticketing or orchestration (such as e.g., ticketing or orchestration information which conform to standards set forth by the Organization for the Advancement of Structured Information Standards OASIS)), a data warehouse (DW) system 178 and/or a SQL system 179. The customer BSS can also be coupled to one or more of a plurality of back end systems.

In combination with the services server 122 and the service desk operation 140, the service delivery platform 130 can proactively generate service calls to a customer. For example, a services appliance might determine that a printer within a customer IT environment is running low on toner. The services appliance generates a message that is provided to the service delivery platform 130. This information is then provided to the network operations center 132, either via a push or pull message. The network operations center 132 can then generate a ticket for the service desk operation 140. Based upon the generation of the ticket, the service desk operation could send a service person to replace the toner cartridge of the printer at the customer IT environment.

In certain embodiments, the remote management platform 120 can include a partner portal 180 (which may for example be included within the network operations center 132). The partner portal can provide a plurality of partner facing functions including a service offering function 181, identity functions 182, service level agreement (SLA) functionality 183, reporting functions 184, analytics functions 185, viewing functions 188, and browser functions 189. Additionally, in certain embodiments, the partner portal 180 can be a multi-tenant partner portal which provides multi-tenant services. The multi-tenant services can include mapping to a company hierarchy, including unique identifiers such as address, Tax ID, and Dun & Bradstreet DUNS number to index individual groupings, such as division and sits. This information can be combined into multiple company hierarchies at granular levels. Multi-tenant operations can be performed on any combination of hierarchy subtrees, nodes or roles within these. Companies can be customers, such as self service customers, or third party service providers such as retailers, value added resellers (VARs) or managed service providers.

Figure 2:
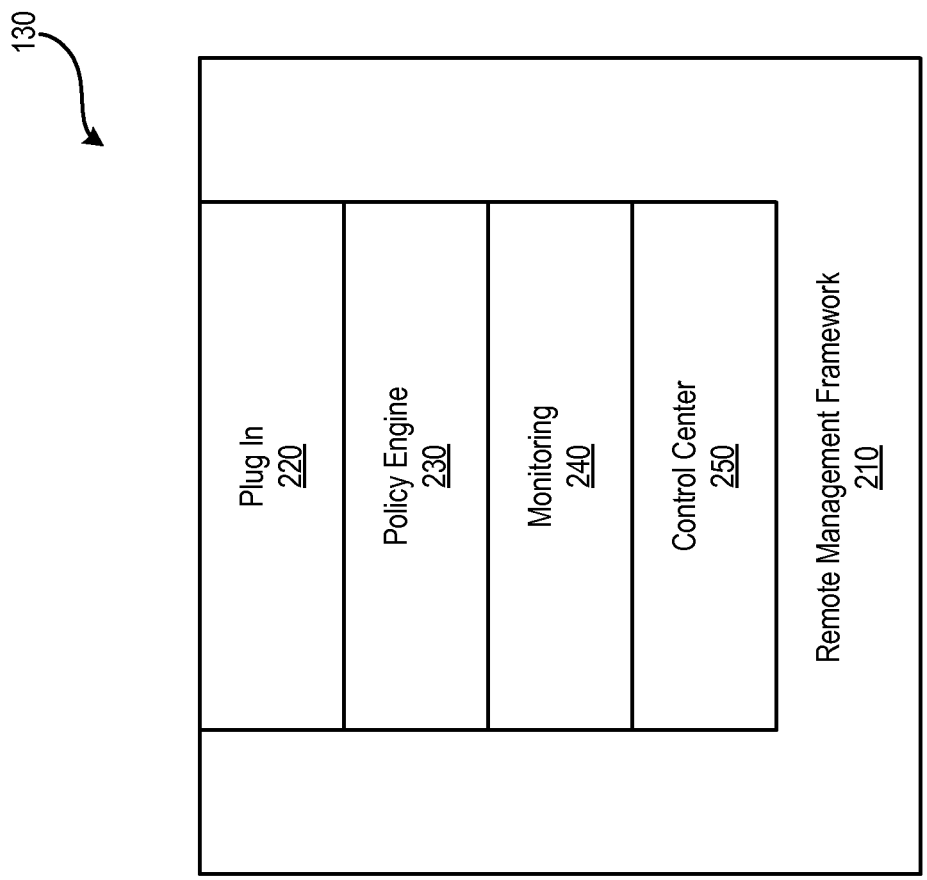
FIG. 2 shows a block diagram of a service delivery platform of the remote services management environment.

FIG. 2 shows a block diagram of a service delivery platform 130 of the remote services management environment 100. More specifically, the service delivery platform 130 includes a remote management framework 210, as well as a plurality of service delivery platform modules. For example, the service delivery platform modules can include a plug in module 220, a policy engine module 230, a monitoring module 240, and a control center 250.

The plug in module 220 allows various applications or functions to be selectively enabled and executed within the remote management framework 210. The policy engine module 230 provides a policy administration function as well as intelligence on how to respond to service events. The policy engine module 230 can provide best action indications based upon service information as well as information provided via the back end portion 114. The monitoring module provides event level monitoring as well as license monitoring and contract clause level monitoring of an IT environment 150.

The control center 250 exposes a plurality of functions provided via the remote management platform. More specifically, the control center can deliver alerts based on platform events and data, the control center 250 can perform an analytics function which supports reporting and analysis across device data, financial data, and application data gathered from the applications integrated within the remote management framework. The control center can provide a user management function which allows administrators to maintain users in terms of roles, permissions, and a list of services a user is allowed to access. The control center 250 can provide a security function which supports security for sign on, user access, and message encryption. The control center 250 can provide a work flow function which provides work flow services to applications executing within the management platform 130.

The service delivery platform 130 uses a combination of web services and command line application program interfaces (APIs) to support the integration of software applications and other functional components to deliver management services and provide functionality to the IT environments 150. The service delivery platform 130 can use services device agents resident on devices within an IT environment or can use a service appliance that communicates with the devices within an IT environment.

Applications executing within the service delivery platform may be delivered via an on-demand model as part of the remote management platform or may be provided via a third party service offering. The service delivery platform 130, through the use of the plug in module 220, optionally and selectively supports service offerings such as asset management, virus protection, patch management, software distribution, and on-line backup.

The service delivery platform 130, through the use of the policy engine module 230 and the monitoring module 240, supports permissions management as well as service entitlement management functions, both of which can be provided via partners or independent software vendors who are making use of the remote management platform 130. Permissions management allows user access to applications executing on the platform to be managed according to user specific roles and permissions associated with those roles. Service entitle management allows applications executing on the platform to deliver functionality based upon varying levels of service set by a customer or partner at the service portal 180.

The IT environment 150 can make use of service device agents. The service device agents may be deployed on devices within the IT environment 150. The service device agents can provide a direct connection (e.g., via the network 152) to the remote management platform 130. The service device agents can execute either generic services or application specific services provided via the applications executing within the plug in module 220. The service device agents and the service appliance provide an extensible mechanism for software download, inventory gathering, logging, and diagnostics. The operations are accessible via a command line, API or Web Service (such as web services corresponding to standards set by the Web Services Interoperability Organization (WS-I)) on the agent or appliance and can be used by integration developers for integrating additional remote services functions. The information collected via the service device agents or the service appliance integrates via the remote management platform and is accessible to applications executing on the service delivery platform.

The service delivery platform 130 can include a plurality of APIs. For example, the service delivery platform 130 can include user synchronization APIs which allow a service provider (or third party using the framework) to synchronize information with the management framework 210. The service delivery platform 130 can also include a data retrieval APIs which allow a service provider (or third party using the framework) to extract data from the service delivery platform 130.

Thus, the service delivery platform 130 can include customer facing APIs which enable integration of existing data regarding users, software licenses, applications and other information that may be used by an application executing within the service delivery platform. The service delivery platform can also include partner facing APIs which enable partner service providers to link existing solutions, such as customer relationship management or service management, with the service delivery platform. These partner facing APIs thus enable a partner using the service delivery platform to deliver value added solutions on top of the service delivery platform, thus facilitating multi-tier use of the service delivery platform.

The service delivery platform 130 of the remote services management environment 100 enables the provision of remote services to customers at a service level agreement (SLA) level. I.e., a plurality of services may be provided to the customer where each of the services corresponds to a clause within a service level agreement. Additionally, the remote management platform 120 enables and empowers a multi tier provision of remote services. With a multi tier provision of remote services, original equipment manufacturer (OEM) service providers or third party service providers can make use of the remote management platform 120 to provide services to a customer where the actual location of the underlying remote management platform 120 is transparent to the customer.

Additionally, the remote management platform 120 enables remote services to be provided using a software as a service (SaaS) business model, which thus effectively becomes providing information technology as a service (ITaaS). Using this model, a customer might only be charged for the remote services that are actually used. (This charge might be monitored e.g., via the monitoring module 240.) The actual supply chain for the revenue generation is via the remote management platform 120. The combination of the monitoring module 240 and the control center 250 facilitates reporting and billing of the services provided by the remote management platform. Remote services provided via the SaaS model may also include other billing options such as subscription, pricing, flexible promotions and marketing, invoicing, financial management, payments, collections, partner relations, revenue analysis, and reporting. With zero or more subscriptions, balances, bills and payments per account, ITaaS pricing can include one-time, recurring, usage, or any event updatable payment method, flexibly based on tier, volume, time, zone attribute or customer. Bundling can include multi-service offerings, up-sell, cross-sell, discounts and promotions. Bundling can integrate a service offering registry 181 with a service catalog management UI per tenant and tier to define a pricing scheme per event type, exclusion rules and dependencies, can create bundled offerings and manage price data or changes to any of these features. Balance management can include real-time threshold notification and balance updates. Service level balances may be provided with separate bills, credit limit monitoring, resource definition, management, and reservation with prepaid IT services. Multi-payment convergent accounts may be provided on a consolidated platform. A single partner or provider can view multiple balances, support sub-balances with validity dates. A service level can be balanced with separate bills and payment methods. Flexible promotions and rapid provider configuration enable marketing which can include quick response to a changing market and competitive purchase and upgrade incentives as well as select and group based promotions and volume and cross service discounts.

Referring to FIG. 3, a block diagram of the plug in module 220 of the service delivery platform 130 is shown. The plug in module 220 includes a plug in base portion 306 which can optionally include any combination of a plurality of plug in functions. The plug in base module 306 can control which of the plurality of plug in functions to which a particular remote service customer might have access. Additionally, the plug in base module 306 interacts with the monitoring module 240 to enable a remoter services provider to track and bill for each of the enabled plug in functions.

In certain embodiments, the plug in functions can include one or more of a base function 310, an asset discovery function 312, an asset management function 314, a software distribution function 316, a software license management function 318, a patch management function 320, an antiMalware management function 322, an online backup function 324, a remote support function 326, a remote access function 328, a data encryption function 330, and a connector API function 332. By providing these functions within the plug in module, it is possible to allow a service provider to easily add or remove functionality to the remote services that are being provided to a particular customer via the service delivery platform.

Each of the plurality of plug in functions can include one or more plug in applications or application-like service independent building blocks (SIBB). For example, the base function can include a hardware inventory application, a site creation application, a bandwidth policy application, a send message to device application, a user management application, an advanced search application, a dashboard application, a data export application, a remote deployment application, a web services application, an alerts and notifications application and a localization application. The various applications may be different brands of applications, different applications within a brand or different versions within the application. The SIBB plug in functions can include sub-parts of applications, which may include separate service offerings as well as additional extensible markup language (XML) document type definitions (DTDs) or schema and their integrations.

By providing these functions within the plug in module 220 it is possible for a service provider to easily change a type of application for each of the functions. E.g., a customer might desire changing from a first brand or version of anti virus software application to another brand or version of anti virus software application, or more than one type of application (e.g., for multiple customer sites, for legacy applications or for acquisitions within the customer IT environment).

FIGS. 4-7 show examples of a plurality of customer IT environments that are included within a remote services management environment.

Figure 4:
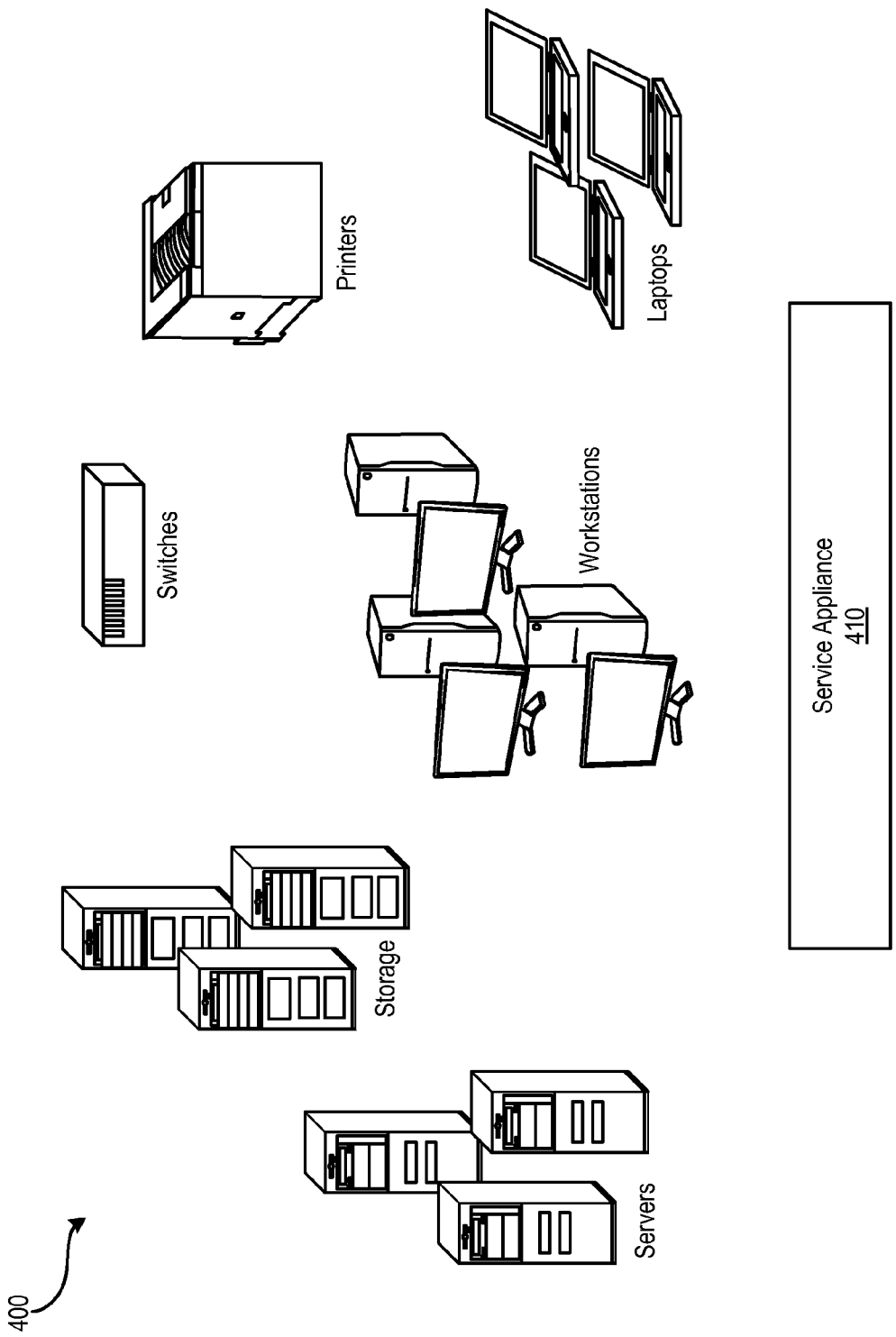
FIG. 4 shows a block diagram of an example customer IT environment.

For example, referring to FIG. 4, an example customer IT environment 400 can include a plurality of information handling system devices such as laptops, workstations, servers, storage devices, switches, and printers. The devices can include their primary operating system (an in-band operating system) as well as a secondary operating system (an out of band operating system) such as a real time operating system, a service processor or a controller. The example customer IT environment 400 also includes a service appliance 410. The service appliance 410 is located within the firewall that protects and separates the customer IT environment 400 from devices external to the customer IT environment 400. The service appliance 410 provides a desktop management function to the customer IT environment and interacts with the remote management platform 120. The service appliance 410 enables service provision across the entire IT environment 400. The service appliance, in combination with the remote management platform, enables generation of reports on proactive service solutions as well as uncovering of new service opportunities.

The service appliance 410 allows agent-less discovery and management of the devices within the IT environment. When performing agent-less discovery, the service appliance 410 accesses all devices and applications of the IT environment 400. By using agent-less discovery, there is no need to deploy agents on every monitored device and all of the agent-less devices may be managed via the service appliance 400.

Figure 5:
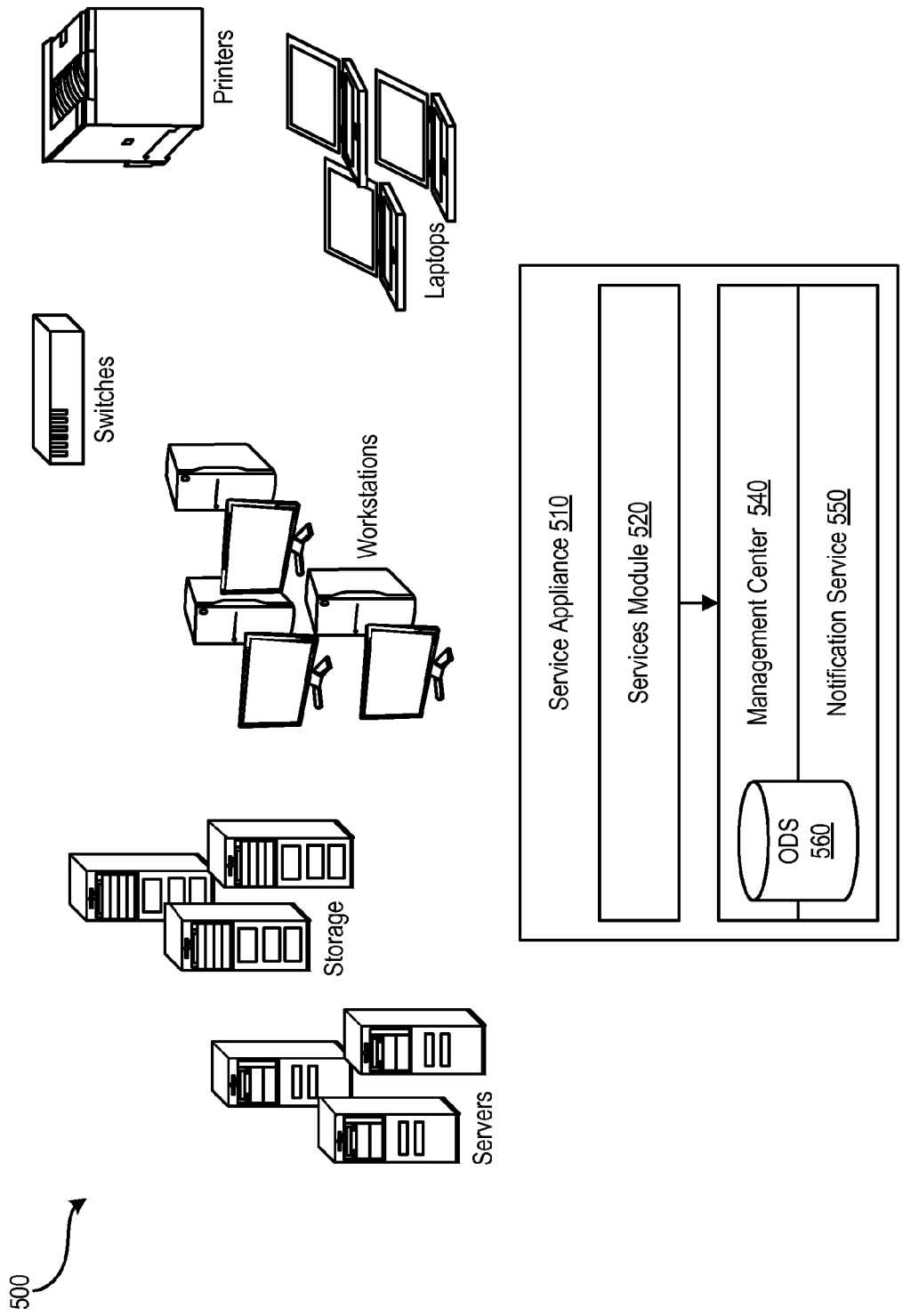
FIG. 5 shows a block diagram of another example customer IT environment.

Referring to FIG. 5, another example customer IT environment 500 can include a plurality of information handling system devices such as laptops, workstations, servers, storage devices, switches and printers. The example customer IT environment 500 also includes a service appliance 510 as well as one or more devices which include an information handling system services module 520 (e.g., a service device agent). The service appliance 510 is located within the firewall that protects and separates the customer IT environment 500 from devices external to the customer IT environment 500. The service appliance 510 provides a desktop management function to the customer IT environment and interacts with the remote management platform 120. The service appliance 510 enables service provision across the entire IT environment 500. The service appliance, in combination with the remote management platform 120, enables generation of reports on proactive service solutions as well as uncovering of new service opportunities.

The service appliance 510 allows agent based, agent-less or hybrid discovery and management of the devices within the IT environment. When using agent based discovery and management, the service appliance 510 interacts with an information handling system services module 520 (e.g., a service device agent) which is loaded on some or all of the devices. The information handling system services module includes a small-footprint, client application that enables information handling systems to be monitored by the service appliance 510. In certain embodiments, the information handling system services module can execute as a Windows Service on the information handling system client.

Alternately, when performing agent-less discovery, the service appliance accesses devices and applications of the IT environment 500. By using agent-less discovery, there is no need to deploy agents on every monitored device, and all of the agent-less devices may be managed via the service appliance 500, such as accessing existing windows services via a simple network management protocol (SNMP), a Windows type remote procedure call (RPC) or a Windows management instrumentation (WMI) type API with local access or directory domain security token such as from either a network operating system security (such as an Active Directory or eDirectory) or from a full Directory Service such as security assertion markup language (SAML) directory service.

The service appliance 510 includes a management center 540 as well as a notification server 550. The management center module 540 and the notification server 550 interact with an operational data store (ODS). The operation data store 550 provides a database for queries on transactional data. The operational data store provides a staging area for data that is provided to the data warehouse of the back end 160. However, the contents of the operational data store are updated with information from the customer IT environment 500.

Figure 6:
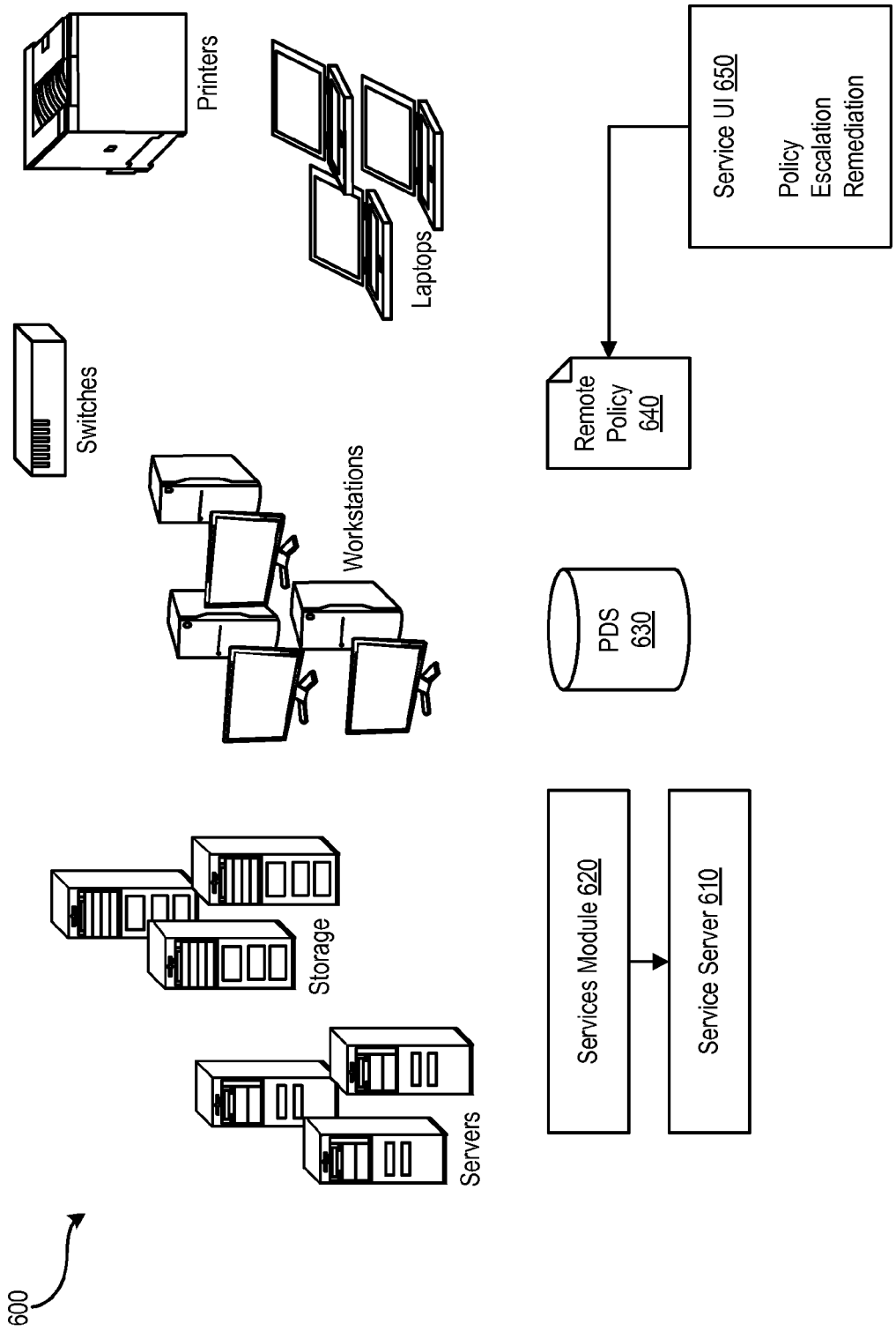
FIG. 6 shows a block diagram of another example customer IT environment.

Referring to FIG. 6, another example customer IT environment 600 can include a plurality of information handling system devices such as laptops, workstations, servers, storage devices, switches and printers. The example customer IT environment 600 also includes a service appliance 610 as well as one or more devices which include an information handling system services module 620 (e.g., a service device agent). The service appliance 610 is located within the firewall that protects and separates the customer IT environment 600 from devices external to the customer IT environment 600. The service appliance 610 provides a desktop management function to the customer IT environment and interacts with the remote management platform 120. The service appliance 610 enables service provision across the entire IT environment 600. The service appliance, in combination with the remote management platform 120, enables generation of reports on proactive service solutions as well as uncovering of new service opportunities.

The service appliance 610 allows agent based, agent-less or hybrid discovery and management of the devices within the IT environment. When using agent based discovery and management, the service appliance 610 interacts with an information handling system services module 620 which is loaded on some or all of the devices. The information handling system services module includes a small-footprint, client application that enables information handling systems to be monitored by the service appliance 610. In certain embodiments, the information handling system services module can execute as a Windows Service on the information handling system client.

Alternately, when performing agent-less discovery, the service appliance accesses devices and applications of the IT environment 600. By using agent-less discovery, there is no need to deploy agents on every monitored device and all of the agent-less devices may be managed via the service appliance 600.

The IT environment 600 also includes a persistent data store (PDS) 630 as well as a remote policy module 640. The persistent data store 630 allows storage of persistent service data within the IT environment 600. This persistent data can include customer specific data as well as data provided via the back end portion 114. The persistent data can be used with the remote policy module 640 to provide recommendations to a customer regarding service opportunities or optimizations. The remote policy module 640 may include a subset of a global policy that is specific to the particular customer. The remote policy module 640 can include resource manifest information, preference information and contracted service offerings that are specific to the particular customer.

The remote policy module 640 interacts with the remote management platform 120 via a service user interface 650. The service user interface 650 enables interaction with a plurality of functions of the remote management platform 120. For example, the service user interface enables interaction with a policy function, an escalation function and a mediation function. The service user interface 650 can include a subset of the partner portal 180 which is specific to the particular customer.

Figure 7:
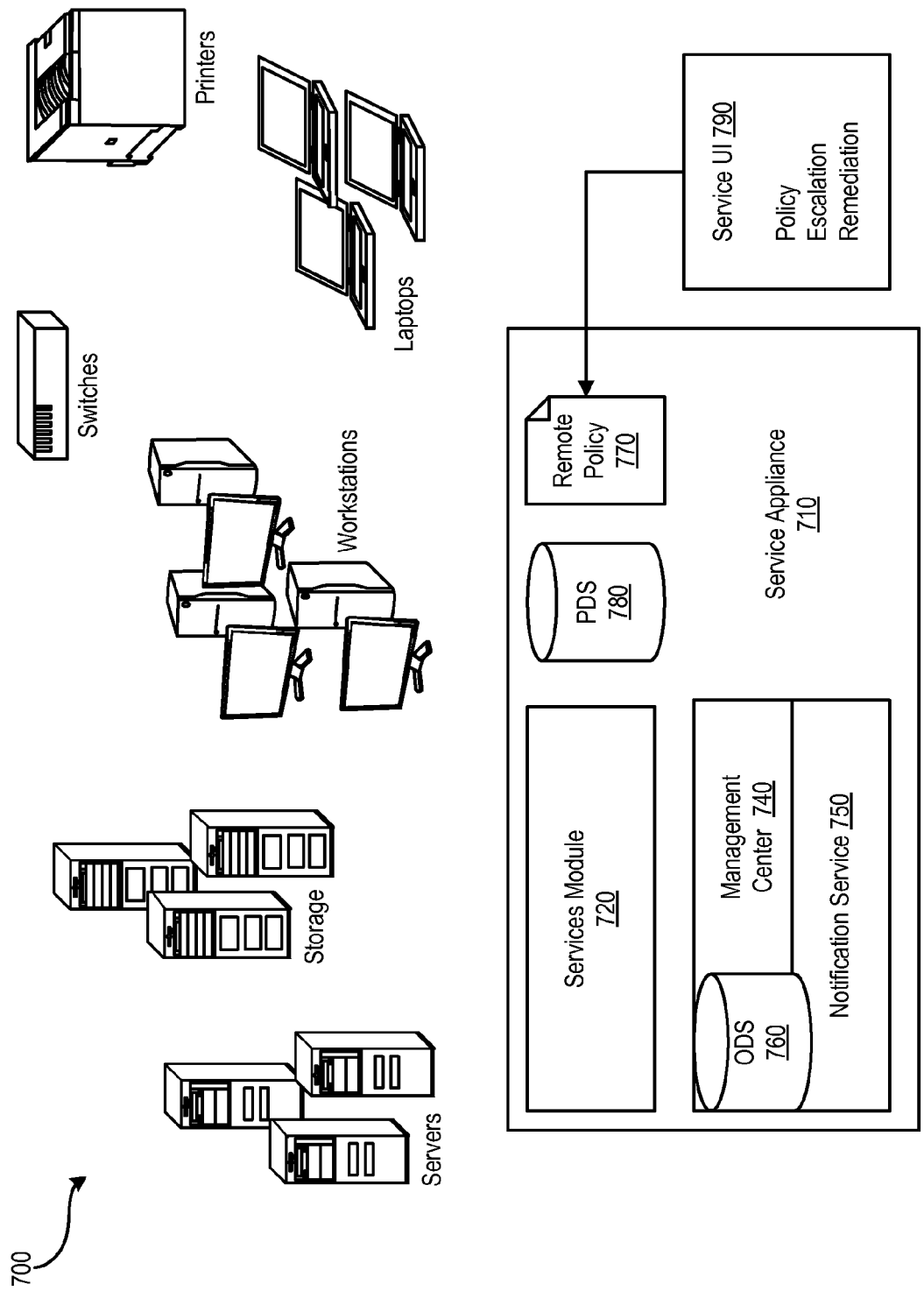
FIG. 7 shows a block diagram of another example customer IT environment.

Referring to FIG. 7, another example customer IT environment 700 can include a plurality of information handling system devices such as laptops, workstations, servers, storage devices, switches and printers. The example customer IT environment 700 also includes a service appliance 710 as well as one or more devices which include an information handling system services module 720 (e.g., a services agent). The service appliance 710 is located within the firewall that protects and separates the customer IT environment 700 from devices external to the customer IT environment 700. The service appliance 710 provides a desktop management function to the customer IT environment and interacts with the remote management platform 120. The service appliance 710 enables service provision across the entire IT environment 700. The service appliance, in combination with the remote management platform 120, enables generation of reports on proactive service solutions as well as uncovering of new service opportunities.

The service appliance 710 allows agent based, agent-less or hybrid discovery and management of the devices within the IT environment. When using agent based discovery and management, the service appliance 710 interacts with an information handling system services module 720 which is loaded on some or all of the devices. The information handling system services module includes a small-footprint, client application that enables information handling systems to be monitored by the service appliance 710. In certain embodiments, the information handling system services module can execute as a Windows Service on the information handling system client.

Alternately, when performing agent-less discovery, the service appliance accesses devices and applications of the IT environment 700. By using agent-less discovery, there is no need to deploy agents on every monitored device and all of the agent-less devices may be managed via the service appliance 700.

The service appliance 710 includes a management center 740 as well as a notification server 750. The management center module 740 and the notification server 750 interact with an operational data store (ODS). The operation data store 750 provides a database for queries on transactional data. The operational data store provides a staging area for data that is provided to the data warehouse of the back end 160. However, the contents of the operational data store are updated with information from the customer IT environment 500.

The service appliance also includes a PDS 770 as well as a remote policy module 780. The remote policy module 780 interacts with the remote management platform 120 via a service user interface 790. The service user interface 790 enables interaction with a plurality of functions of the remote management platform 120. For example, the service user interface enables interaction with a policy function, an escalation function and a mediation function.

Figure 8:
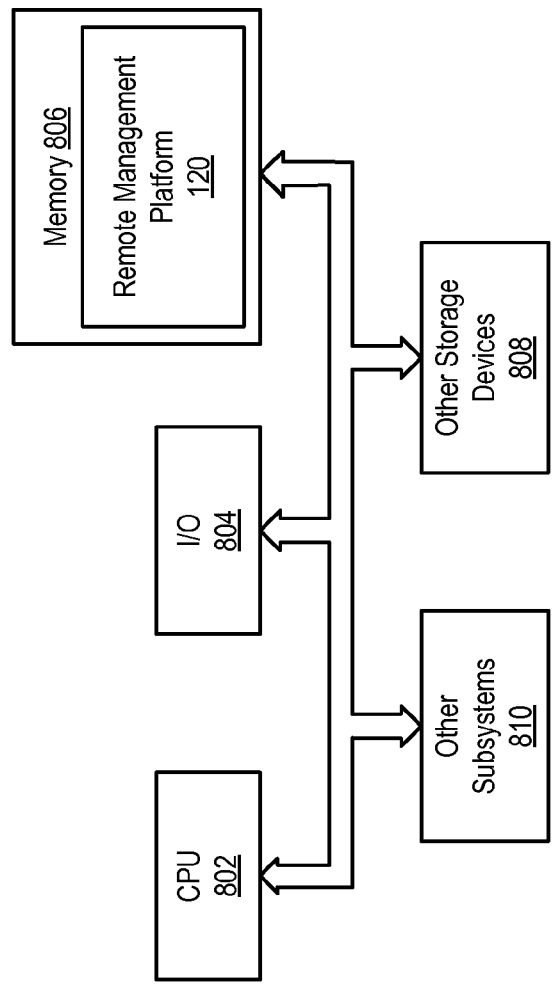
FIG. 8 shows a block diagram of an information handling system on which the remote management platform may be executed.

Referring briefly to FIG. 8, a system block diagram of an information handling system 800 is shown. The information handling system 800 includes a processor 802, input/output (I/O) devices 804, such as a display, a keyboard, a mouse, and associated controllers, memory 806, including volatile memory such as random access memory (RAM) and non-volatile memory such as read only memory (ROM) and hard disk drives, and other storage devices 808, such as a floppy disk and drive or CD-ROM disk and drive, and various other subsystems 810, all interconnected via one or more buses 812. The memory 806 includes the remote management platform 120, which may be executed by the processor 802.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, many variations of automatic ordering of remote management services are within the scope of the present invention. For example, the remote management platform 120 can enable automatic ordering of remote services based upon criteria such as membership and order details. The ordering can include initial services, renewal of services, updating of services or upgrading to include additional or expanded services. Additionally, the automatic ordering can include when an actual or expected average usage of a service is close to or below a predefined user service level. The service level can include conditions relating to the service, including service supply, aging, usage, depletion rate, consumption, predicted date of service level, predicted data of a need for service, delivery schedule of service and statistical data. A cost associated with the automatic ordering can be discounted based upon various criteria.

The automatic ordering can be provided via a reorder subscription service. Users can be rewarded for consecutive and uninterrupted membership in the reorder subscription service. Users can also be rewarded based on volume, discount qualification, consecutive orders, referrals or some combination of these features.

The automatic ordering can further include an incentive feature when a service is close to or below a user service level. This incentive can be generated by a printer such as a printer within the IT environment. The incentive indicia can include a data indication which indicates that the incentive is only available for a preset amount of time.

The membership can include user identification, membership role, billing information and forms of payment indicia. The membership role can include an intermediary of other memberships including a managed service provider, a value added reseller or a designated proxy. The membership role can also include a group super user, including a system administrator for group updates and enforcing desired service levels and remote monitoring management. The automatic ordering can be based upon order context, GPS location or order time. The automatic ordering can also include a purchase invitation in the form of an Internet web page offering remote services. The web page offering can also provide vendor offering for products that are compatible for use with the remote services. Typically, only products which are compatible with the remote service are listed on the web page so that the user is assured that any product selected from the purchase invitation are compatible with the ordered remote services. Alternately, the compatible products may be distinguished from non-compatible products by various indicia such as group, markup, highlight, etc. The compatible and non-compatible products may be distinguished based on corporate policy or governance standards for compatibility.

The remote services can monitor or manage local resources or devices directly via a runtime agent or agentless via an appliance gateway that can manage numerous agentless nodes. The remote services can be factory installed on the serviced devices, its agent or a servicing appliance gateway. The remote services can include a reporting of selected services, their status, usage and impact, with optional ties to whether the services were ordered automatically. The remote services may be provided to the customer under a time trial, can be rented to the customer or can be purchased by the customer. Additionally, the remote services can include a version control feature.

Consequently, the invention is intended to be limited only by the spirit and scope of the appended claims, giving full cognizance to equivalents in all respects.

What is claimed is:

1. An apparatus for providing remote services to an integrated information technology environment, the information technology environment comprising a services appliance, the services appliance providing agent-less monitoring of information handling systems within the information technology environment, the apparatus comprising:
   a processor;
   a memory; and
   a remote management platform, the remote management platform being configured to receive services information from the services appliance, the remote management platform analyzing the services information and determining a response based upon the services information, the remote management platform initiating the response by the remote management platform based upon the services information, the remote management platform comprising a plurality of service delivery platform modules, one of the plurality of service delivery platforms modules comprising a plug in module, the plug in module allowing Service Independent Building Blocks (SIBBs) to be selectively enabled and executed within the remote management platform, the SIBBs comprising sub-parts of applications, at least some of the sub-parts of applications comprising separate service offerings as well as additional extensible markup language (XML) document type definitions (DTDs), the plug in module providing a base function, the base function comprising at least one of a hardware inventory application, a site creation application, a bandwidth policy application, a send message to device application, a user management application, an advanced search application, a dashboard application, a data export application, a remote deployment application, a web services application, an alerts and notifications application and a localization application.

2. The apparatus of claim 1 wherein the plurality of service delivery platform modules comprise:
   a monitoring module, the monitoring module providing event level monitoring as well as license monitoring and contract clause level monitoring of the information technology environment.

3. The apparatus of claim 1 wherein the remote management platform further comprises:
   a control center, the control center exposing a plurality of functions provided via the remote management platform.

4. The apparatus of claim 3 wherein:
   the plurality of functions provided via the remote management platform comprise at least one of an analytics function which supports reporting and analysis across device data, financial data and application data gathered from the applications integrated within the remote management framework, a user management function which allows administrators to maintain users in terms of roles, permissions and a list of services a user is allowed to access, a security function which supports security for sign on, user access and message encryption, and a work flow function which provides work flow services to applications executing within the management platform.

5. A method for providing remote services to an information technology environment, the information technology environment comprising a services appliance, the services appliance providing agent-less monitoring of information handling systems within the information technology environment, the method comprising:
   providing a remote management platform, the remote management platform comprising a plurality of service delivery platform modules, one of the plurality of service delivery platform modules comprising a plug in module, the plug in module allowing Service Independent Building Blocks (SIBBs) to be selectively enabled and executed within the remote management platform, the SIBBs comprising sub-parts of applications, at least some of the sub-parts of applications comprising separate service offerings as well as additional extensible markup language (XML) document type definitions (DTDs), the plug in module providing a base function, the base function comprising at least one of a hardware inventory application, a site creation application, a bandwidth policy application, a send message to device application, a user management application, an advanced search application, a dashboard application, a data export application, a remote deployment application, a web services application, an alerts and notifications application and a localization application;

receiving services information from the services appliance by the remote management platform, the remote management platform analyzing the services information and determining a response based upon the services information;

initiating the response by the remote management platform based upon the services information.

6. The method of claim 5 wherein the plurality of service delivery platform modules comprise:

a policy engine module, the policy engine module providing best action indications based upon service information.

7. The method of claim 5 wherein the plurality of service delivery platform modules comprise:

a monitoring module, the monitoring module providing event level monitoring as well as license monitoring and contract clause level monitoring of the information technology environment.

8. The method of claim 5 wherein the remote management platform further comprises:

a control center, the control center exposing a plurality of functions provided via the remote management platform.

9. The method of claim 8 wherein:

the plurality of functions provided via the remote management platform comprise at least one of an analytics function which supports reporting and analysis across device data, financial data and application data gathered from the applications integrated within the remote management framework, a user management function which allows administrators to maintain users in terms of roles, permissions and a list of services a user is allowed to access, a security function which supports security for sign on, user access and message encryption, and a work flow function which provides work flow services to applications executing within the management platform.

10. The apparatus of claim 1 wherein the plurality of service delivery platform modules comprise:

a policy engine module, the policy engine module providing best action indications based upon service information.

* * * * *